United States Patent
Huonder

[11] Patent Number: 5,917,961
[45] Date of Patent: *Jun. 29, 1999

[54] IMAGE CONVOLUTION USING PRE-CALCULATED LOOKUP TABLES

[75] Inventor: Russell J. Huonder, Fort Collins, Colo.

[73] Assignee: Hewlett-Packard Co., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/741,487

[22] Filed: Oct. 30, 1996

[51] Int. Cl.$^6$ .......................... G06K 15/316; G06K 9/64
[52] U.S. Cl. .......................... 382/279; 382/276; 382/277; 382/280; 345/137; 364/728.01; 364/728.02
[58] Field of Search .................. 382/279, 276, 382/277, 280; 345/137; 364/728.01, 728.02

[56] References Cited

U.S. PATENT DOCUMENTS

| | | |
|---|---|---|
| 4,720,871 | 1/1988 | Chambers ............................ 382/42 |
| 4,725,892 | 2/1988 | Suzuki et al. ........................ 358/287 |
| 5,054,097 | 10/1991 | Flinois et al. ....................... 382/44 |
| 5,151,953 | 9/1992 | Landeta .............................. 382/41 |
| 5,488,674 | 1/1996 | Burt et al. .......................... 382/284 |

*Primary Examiner*—Leo H. Boudreau
*Assistant Examiner*—Kanji Patel

[57] ABSTRACT

Methods and apparatus are provided for processing a source image in an image processing system including an electronic digital computer and image processing software for operating the computer. The source image is processed by convolution of pixels of the source image with coefficients of a convolution kernel to provide an output image. A lookup table is generated before new pixel values are determined. The table includes products of each coefficient and each possible value of the pixel in the source image. For each of the coefficients, the product that corresponds to the pixel value in a convolution window is accessed in the table. The accessed products are summed to provide a new pixel value in the output image. The steps of accessing the products in the table and summing the accessed products are repeated for each of the source pixels being convolved.

17 Claims, 5 Drawing Sheets

TABLE_K00 WITH K00 = 0.111

| Index | Value |
|---|---|
| [0] | 0.000 |
| [1] | 0.111 |
| [2] | 0.222 |
| [...] | ... |
| [...] | ... |
| [253] | 28.083 |
| [254] | 28.194 |
| [255] | 28.305 |

Fig. 3

IMAGE CONVOLUTION USING PRE-CALCULATED LOOKUP TABLES

FIELD OF THE INVENTION

This invention relates to image processing and, more particularly, to methods and apparatus for performing image convolutions using pre-calculated lookup tables to reduce processing time.

BACKGROUND OF THE INVENTION

Convolutions are used in image processing to perform low pass filtering (blurring), high pass filtering (sharpening), edge detection, edge enhancement and other functions. Convolution is a weighted sum of pixels in the neighborhood of a source pixel. The weights are determined by a matrix of coefficients called a convolution kernel, which is usually square. The dimensions of the matrix are usually odd, so that the center of the matrix corresponds to the location of the output pixel. A sliding window, called a convolution window, is centered in sequence on each pixel in a source image. An output pixel value is computed by multiplying each pixel value in the convolution window by the corresponding coefficient in the convolution kernel and summing the products. This process is repeated for each pixel in the source image or in a selected region of the source image.

A 3×3 convolution kernel has nine coefficients arranged in a 3×3 matrix. To perform a 3×3 convolution operation on a pixel of a source image, nine different floating point convolution kernel values are multiplied by nine different pixel values of the source image, and the products are summed together. Thus, nine floating point multiplications and eight floating point additions are required for each source pixel. Since image sizes typically range from 256×256 to 4096×4096, this sequence of operations is performed many times (256×256=65,536; 4096×4096=16,777,216) each time the image is drawn. Convolutions with larger convolution kernels, such 5×5, 7×7, etc., require even more calculations. Thus, the processing time required to perform image convolution can be relatively long. A reduction in processing time would be highly beneficial.

SUMMARY OF THE INVENTION

According to a first aspect of the invention, a method is provided for processing a source image of an object in an image processing system comprising an electronic digital computer and image processing software for operating the computer. The source image is processed by convolution of pixels of the source image with coefficients of a convolution kernel to provide an output image of the object. The source image and the output image each comprise a two-dimensional array of pixels. Each of the pixels in the source image has a value representative of the object. A table is generated before new pixel values are determined. The table includes products of each coefficient and each possible value of the pixel in the source image. For each of the coefficients, the product that corresponds to the pixel value in a convolution window is accessed in the table. The accessed products are summed to provide a new pixel value in the output image. The steps of accessing the products in the table and summing the accessed products are repeated for each of the source pixels being convolved.

The table may be organized to include a table section corresponding to each coefficient of the convolution kernel. Each table section includes products of one of the coefficients multiplied by each possible pixel value. The table may be generated by multiplying each coefficient by each possible pixel value to provide the products, and storing the products in the table.

In one example, the convolution kernel comprises a 3×3 array of coefficients and the convolution window comprises a 3×3 array of pixels. In this example, the table may include 9 sections, one corresponding to each coefficient of the convolution kernel. The convolution may be performed for substantially all the pixels in the source image or for a subset of the pixels in the source image.

According to another aspect of the invention, image processing apparatus is provided for processing a source image of an object, by convolution of pixels of the source image with coefficients of a convolution kernel, to provide an output image of the object. The image processing apparatus comprises an electronic digital computer and image processing software for operating the computer. The image processing software comprises means for generating a table which includes products of each coefficient and each possible value of a pixel in the source image, means for accessing in the table the product, for each of the coefficients, that corresponds to a pixel value in a convolution window associated with a source pixel, means for summing the accessed products to provide a new pixel value in the output image, and means for controlling the accessing means and the summing means to provide new pixel values for each of the source pixels being convolved.

According to a further aspect of the invention, a computer-readable medium is encoded with a computer program for processing a source image of an object, by convolution of the source image with coefficients of a convolution kernel, to provide output image of the object. The source image and the output image each comprise a two-dimensional array of pixels. Each of the pixels in the source image has a value representative of the object. The computer program comprises computer instructions for generating a table which includes products of each of the coefficients and each of the possible values of a pixel in the source image, accessing in the table the product, for each of the coefficients, that corresponds to a pixel value in a convolution window associated with a source pixel, summing the accessed products to provide a new pixel value in the output image, and repeating the accessing and summing steps for each of the source pixels being convolved.

BRIEF DESCRIPTION OF THE DRAWINGS

For a better understanding of the present invention, reference is made to the accompanying drawings, which are incorporated herein by reference and in which:

FIG. 3 shows an example of a section of a lookup table in accordance with the present invention;

DETAILED DESCRIPTION

Figures 1, 2:
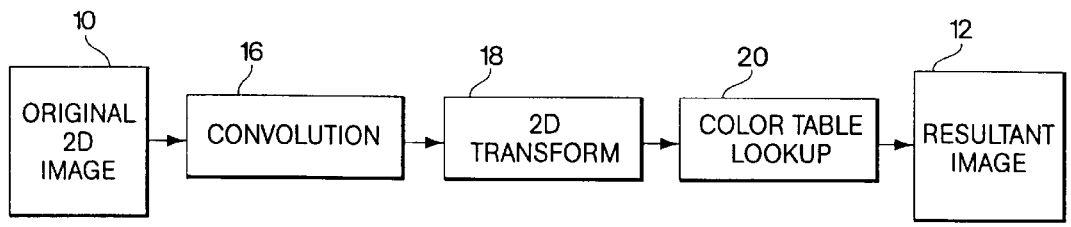
FIG. 1 illustrates the operations performed in a typical image processing pipeline.
FIG. 2 is a pictorial diagram that illustrates how a convolution kernel is used to determine a new pixel value.

A typical image processing pipeline is illustrated in FIG. 1. An original source image 10 is processed by the image processing pipeline to provide an output image 12. The source image 10 is represented by an array of pixels. The pixel array of the source image may have any desired dimensions. Typical image sizes range from 256 rows by 256 columns to 4096 rows by 4096 columns. In a gray scale image, each pixel is represented by a single pixel value, which may for example have 8 bits. In a color image, each pixel is represented by red, green and blue pixel values, each of which may have 8 bits. The output image 12 that results from image processing typically has the same or approximately the same number of pixels as the source image. It will be understood that the number of rows and columns in the source image and the number of bits used to represent each pixel value may be varied within the scope of the present invention.

The image processing pipeline shown in FIG. 1 involves convolution 16, two-dimensional transformation 18 and color table lookup 20. Convolution is typically performed on the source image data set before any transformations. The convolution is a filtering operation which may be used to provide a number of effects, such as smoothing, sharpening, edge detection and the like. These very different effects can be obtained by changing the coefficient values in the convolution kernel. The transformation 18 may, for example, involve scaling, rotating and/or translating of the source image. The color table lookup provides an image color value or gray scale value corresponding to each pixel value. The transformation and color table lookup operations are well known to those skilled in the art. The present invention relates to improved methods and apparatus for performing the convolution 16.

The convolution operation is described with reference to the example of FIG. 2. An image 40 is represented by a 7×7 array of pixel values I00–I66, where the first digit indicates the pixel row in the 7×7 array and the second digit indicates the pixel column. It will be understood that typical images are much larger than 7×7 pixels. The image 40 is to be convolved with a 3×3 convolution kernel 42. The convolution kernel 42 includes a 3×3 array of convolution coefficients K00–K22, where the first digit indicates the coefficient row in the 3×3 array and the second digit indicates the coefficient column. In FIG. 2, the convolution kernel 42 is positioned over pixel I23 in the source image. The portion of the source image covered by the convolution kernel 42 is known as a convolution window. In particular, coefficients K00, K01, K02, K10, K11, K12, K20, K21 and K22 cover pixels I12, I13, I14, I22, I23, I24, I32, I33 and I34, respectively. The new pixel value for pixel I23 is evaluated as follows:

newI23=

I32*K20+I33*K21+I34*K22+

I22*K10+I23*K11+I24*K12+

I12*K00+I13*K01+I14*K02      (1)

The calculation of equation (1) is repeated for each pixel in the source image.

In prior art convolution techniques, the calculation of equation (1) is performed for each pixel in the source image. This calculation requires nine floating point multiplications and eight floating point additions. Because these operations are performed for every pixel in the source image, any time savings would be significant.

For a source image having 8-bit pixel values, there are 256 possible values for each pixel. A 3×3 convolution kernel has nine floating point coefficient values. In accordance with the invention, a lookup table is generated. Each coefficient of the convolution kernel is multiplied by each of the different pixel value possibilities. The generation of the lookup table for a 3×3 convolution kernel and 8-bit pixel values may be represented as follows.

for {i=0;i<256;++i} /*i will be 0, 1, 2, . . . 253, 254, 255*/

{ table_K00[i]=K00*i;

table_K01[i]=K01*i;

table_K02[i]=K02*i;

table_K10[i]=K10*i;

table_K11[i]=K11*i;

table_K12[i]=K12*i;

table_K20[i]=K20*i;

table_K21[i]=K21*i;

table_K22[i]=K22*i;      (2)

}

Generation of the lookup table for a 3×3 convolution kernel and 8-bit pixel values requires 2304 floating point multiplication operations. As described below, the lookup table eliminates the need for floating point multiplication operations during calculation of new pixel values. The overhead of the table generation is relatively small by comparison with prior art convolution techniques, since even a small image requires a large number of multiplication operations using the prior art convolution technique. In particular, a 16×16 image requires 2304 floating point multiplication operations (16×16×9=2304) using the prior art convolution technique. In fact, typical image sizes range from 256×256 to 4096×4096.

The lookup table is advantageously organized as one section for each coefficient value of the convolution kernel. Each section includes products of the coefficient value and each possible pixel value. The lookup table may be implemented using conventional software table techniques, with storage of the table values in computer memory.

An example of a section of a lookup table is shown in FIG. 3, for a single coefficient K00 having a value of 0.111. The coefficient value is multiplied by each of the 256 pixel values, and the products are entered into the table. For example, a pixel value of 253 corresponds to a table value of 28.083 (0.111×253). A similar table section is generated for each coefficient value of the convolution kernel.

Following generation of the table, a new pixel value in the output image may be calculated. For each pixel in the convolution window, a table lookup is performed. Thus, for example, with reference to FIG. 2, a table value corresponding to coefficient K00 and pixel I12 is accessed. The pixel value of pixel I12 is used as an index to a table value in the table section corresponding to coefficient K00. Assume, for example, that pixel I12 has a value of 253 and that coefficient K00 has a value of 0.111. As shown in FIG. 3, the pixel value of 253 is used to index the table value of 28.083. The table lookup is repeated for each of the other coefficients in the convolution kernel. The new pixel value is calculated by summing the nine table values as follows:

newI23=table_K20[I32]+table_K21[I33]+table_K22[I34]+

$$\text{table\_K10}[I22] + \text{table\_K11}[I23] + \text{table\_K12}[I24] +$$
$$\text{table\_K00}[I12] + \text{table\_K01}[I13] + \text{table\_K02}[I14] \qquad (3)$$

The calculation of each new pixel value thus requires nine table lookups and eight additions. The nine floating point multiplications per pixel used in prior art convolution techniques are replaced by nine table lookups. Typically, table lookups are faster than multiplications by a factor of about 4. The lookup of table values and the summing of table values according to equation (3) is repeated for each source pixel to be convolved, typically the entire source image.

Figure 4:
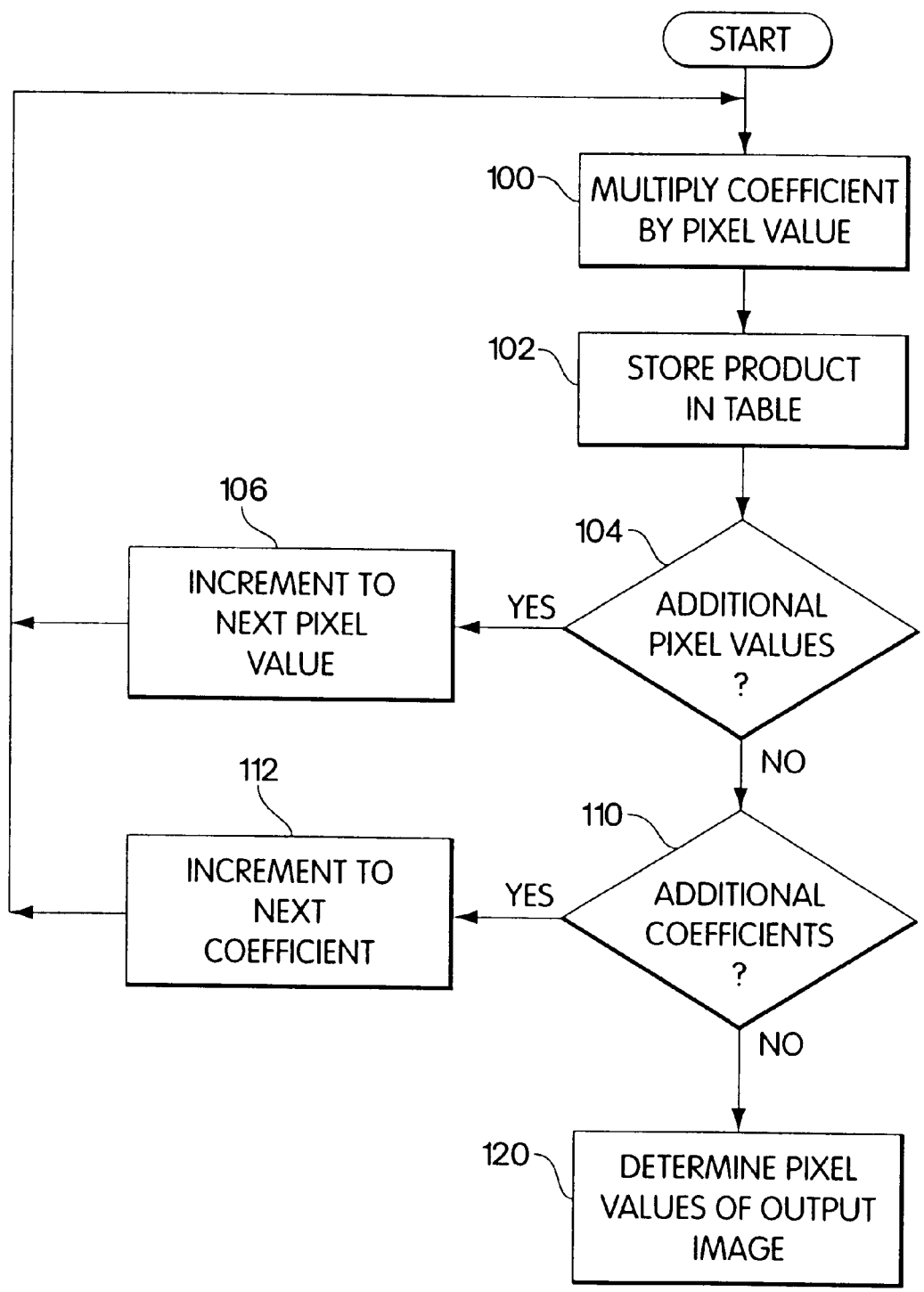
FIG. 4 is a flow chart that illustrates the operations involved in performing a convolution in accordance with the present invention.

An example of a process for convolution in accordance with the present invention is illustrated in the flow chart of FIG. 4. In general, the process involves generating a lookup table followed by calculating pixel values of the new image. In step 100, a coefficient of the convolution kernel is multiplied by a pixel value, and the product is stored in the lookup table in step 102. The multiplication is typically a floating point multiplication. A determination is made in step 104 whether additional pixel values require multiplication by the coefficient. When additional pixel values require multiplication, the process increments to the next pixel value in step 106 and returns to step 100. The new pixel value is multiplied by the coefficient, and the process is repeated. The loop including steps 100, 102, 104 and 106 is repeated for each possible pixel value (256 times for 8-bit pixel values). After all pixel values have been multiplied by the coefficient, a determination is made in step 110 whether additional coefficients require multiplication by pixel values. When additional coefficients require multiplication, the process increments to the next coefficient in step 112 and returns to step 100. The loop including steps 110 and 112 is repeated for each coefficient in the convolution kernel. Thus, for a 3×3 convolution kernel, this loop is repeated nine times. Steps 100, 102, 104, 106, 110 and 112 implement equation (2) above. Following generation of the lookup table values, the pixel values of the new image are determined in step 120.

Figure 5:
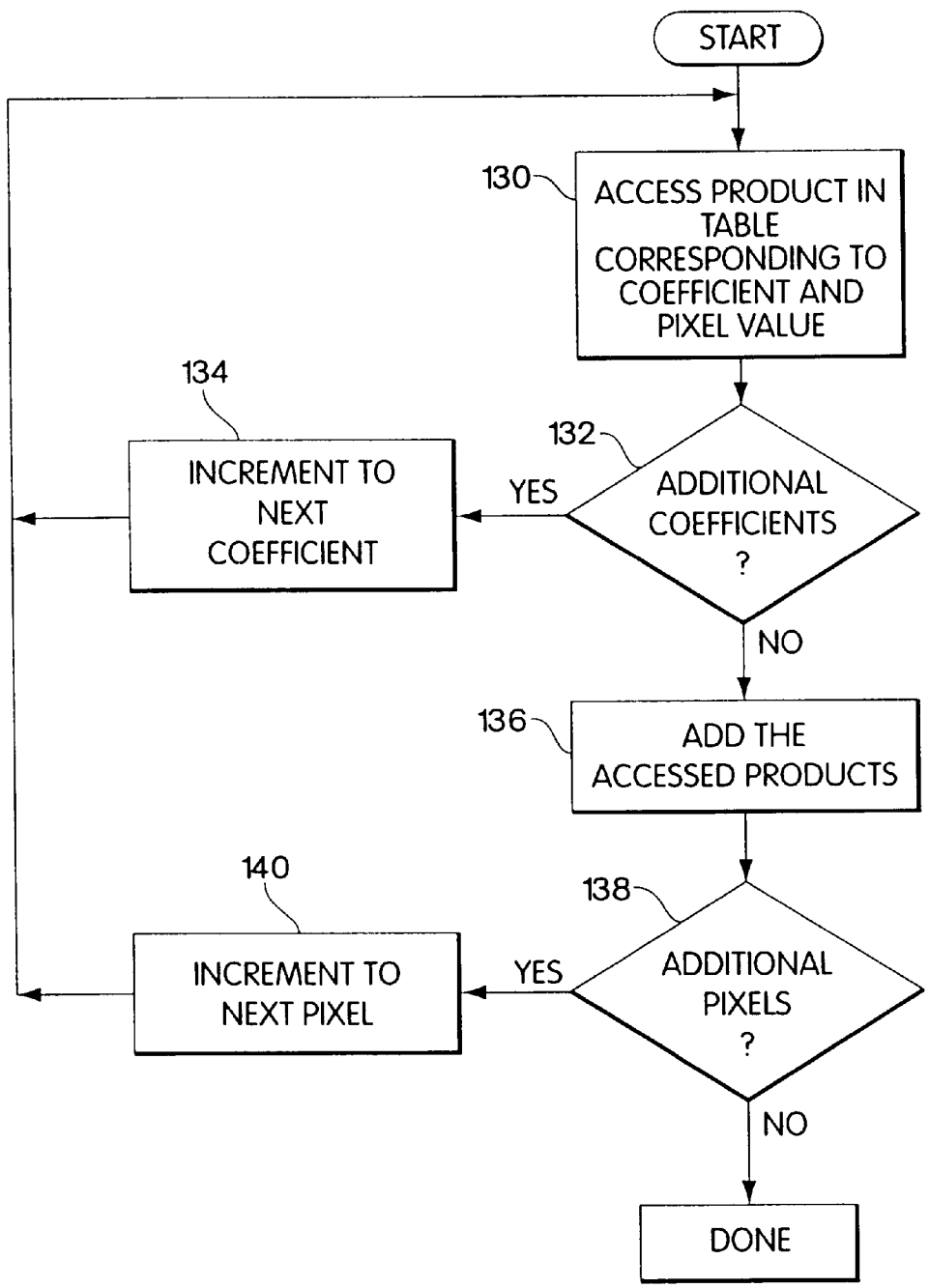
FIG. 5 is a flow chart that illustrates the operations performed in determining pixel values of an output image from a lookup table in accordance with the invention.

The operations required to determine pixel values of the new image (step 120 in FIG. 4) are shown in the flow chart of FIG. 5. For a selected pixel, a product corresponding to a coefficient in the convolution kernel is accessed in the lookup table in step 130. A determination is made in step 132 whether additional coefficients require accessing of products in the lookup table. When additional coefficients remain, the process increments to the next coefficient in step 134 and returns to step 130. The loop including steps 130, 132 and 134 is repeated for each coefficient in the convolution kernel. Referring again to FIG. 2, to calculate pixel value I23 in the output image, table values for each of the 9 coefficients in the convolution kernel are accessed in the lookup table. As described above, the pixel value in the convolution window is used as an index to the table section corresponding to each coefficient of the convolution kernel. In step 136, the accessed products from the lookup table are added to produce the new pixel value. Steps 130, 132, 134 and 136 correspond to equation (3) above. In step 138, a determination is made whether additional source pixels require calculation. When additional source pixels require calculation, the process increments to the next pixel in step 140 and returns to step 130 for calculation of the new pixel value. The loop including steps 138 and 140 is repeated for each pixel in the source image or for each pixel in a selected region of the source image.

Figure 6:
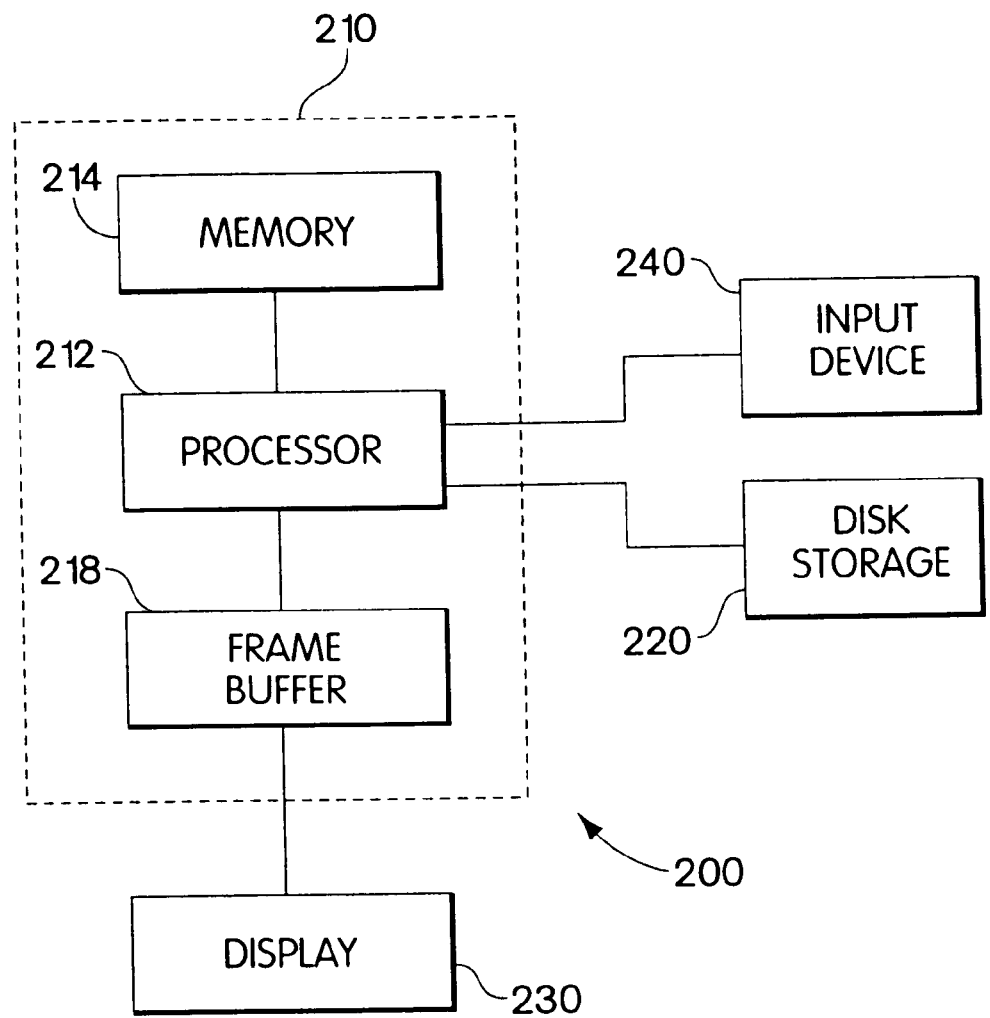
FIG. 6 is a block diagram of an example of a hardware configuration for implementing the present invention.

The image processing operations described herein may be performed on a personal computer (PC), workstation or special purpose image processing hardware. A block diagram of an example of a computer system 200 suitable for performing convolutions of digital images in accordance with the present invention is shown in FIG. 6. The computer system 200 includes a central processing unit (CPU) 210, a disk storage unit 220, a display 230 for displaying source images of objects and output images of objects, and an input device 240. The disk storage unit 220 is typically implemented using one or more hard disk drives. Input device 240 may be implemented using a standard keyboard and pointing device, such as a mouse or trackball.

The CPU 220 includes a processor 212, a memory 214 and a frame buffer 218 for storing an image to be displayed on the display 230. The processor 212 provides the primary processing capabilities of the computer system 200 and may, for example, be implemented using a model C110 manufactured by Hewlett-Packard Company. The memory 214 is used for storage of program instructions and for storage of results of calculations performed by the processor 212. In the preferred embodiment, the memory includes 64 megabits of RAM. The frame buffer 218 is a high-speed memory device capable of storing one frame of data for the display 230. The frame buffer 218 may, for example, be a model HCRX-24 manufactured by Hewlett-Packard Company. The software routines for performing image convolutions in accordance with the invention may be implemented using the "C" programming language and may reside in memory 214 and/or disk storage unit 220. The computer program for performing image convolution in accordance with the invention may be stored on a computer-readable medium such as, for example, magnetic disk, compact disk or magnetic tape and may be loaded into the computer system 200 using an appropriate peripheral device, as known in the art. It will be understood that the hardware components identified above are given by way of example only and that the invention may be implemented in a variety of different computer systems.

The convolution technique disclosed herein has been described by way of an example utilizing a 3×3 convolution kernel and 8-bit pixel values. It will be understood that the invention is applicable to convolution kernels with different dimensions and to source images wherein the pixel values are represented by different numbers of bits. The reduction in processing time in a particular application depends on a number of factors, including the dimensions of the convolution kernel, the number of bits used to represent the pixel values, the number of pixels in the source image, and the relative speeds of multiplications and table lookups in a particular computer. The convolution technique has been described in connection with a grey scale image. However, the technique may be applied separately to the red, green and blue pixel values of a color source image. The convolution may be performed on all the pixels in the source image or on a subset of the pixels in the source image. The convolution technique of the present invention may be implemented either in software or in hardware.

While there have been shown and described what are at present considered the preferred embodiments of the present invention, it will be obvious to those skilled in the art that various changes and modifications may be made therein without departing from the scope of the invention as defined by the appended claims.

What is claimed is:

1. In an image processing system comprising an electronic digital computer and image processing software for operating said computer, a method for processing a source image of an object, by convolution of pixels of the source image with coefficients of a convolution kernel, to provide an output image of the object, said source image and said output image each comprising a two-dimensional array of pixels, each of said pixels in said source image having a value representative of the object, said image processing software executing steps comprising:

a) prior to processing of said pixels in said source image, generating a table which includes products of each of the coefficients and each of the possible pixel values;

b) processing said pixels in said source image by accessing in said table the product, for each of said coefficients, that corresponds to a pixel value in a convolution window associated with a source pixel;

c) further processing said pixels in said source image by summing the accessed products to provide a new pixel value in the output image; and d) repeating steps b) and c) for each of the source pixels being convolved, wherein the products are accessed and the accessed products are summed without multiplication operations, thereby reducing the time required for processing said source image.

2. A method as defined in claim 1 wherein said convolution kernel comprises a 3×3 array of said coefficients and said convolution window comprises a 3×3 array of pixels.

3. A method as defined in claim 1 wherein step d) comprises repeating steps b) and c) for substantially all of the pixels in the source image.

4. A method as defined in claim 1 wherein step d) comprises repeating steps b) and c) for a subset of the pixels in the source image.

5. A method as defined in claim 1 wherein said table comprises a table section corresponding to each of the coefficients of the convolution kernel, each table section including products of one of the coefficients multiplied by each possible pixel value.

6. A method as defined in claim 1 wherein the step of accessing the products in said table comprises accessing a product in each table section that corresponds to the pixel value of the convolution window pixel.

7. A method as defined in claim 1 wherein the step of generating a table includes multiplying each of the coefficients by each possible pixel value to provide said products, and storing said products in said table.

8. A method as defined in claim 7 wherein the step of multiplying comprises a floating point multiplication operation.

9. Image processing apparatus for processing a source image of an object, by convolution of pixels of the source image with coefficients of a convolution kernel, to provide an output image of the object, said source image and said output image each comprising a two-dimensional array of pixels, each of said pixels in said source image having a value representative of the object, comprising:

an electronic digital computer and image processing software for operating said computer, said image processing software comprising:

means for generating a table prior to processing of said pixels in said source image, said table including products of each of the coefficients and each of the possible pixel values;

means for processing said pixels in said source image by accessing in said table the product, for each of said coefficients, that corresponds to a pixel value in a convolution window associated with a source pixel;

means for further processing said pixels in said source image by summing the accessed products to provide a new pixel value in the output image; and means for controlling said accessing means and said summing means to determine new pixel values for each of the source pixels being convolved, wherein the products are accessed and the accessed products are summed without multiplication operations, thereby reducing the time required for processing source image.

10. Image processing apparatus as defined in claim 9 wherein said convolution kernel comprises a 3×3 array of said coefficients and said means for generating a table comprises means for generating a table section for each of the nine coefficients in the convolution kernel.

11. Image processing apparatus as defined in claim 9 wherein said controlling means comprises means for controlling said accessing means and said summing means to determine new pixel values for substantially all of the pixels in the source image.

12. Image processing apparatus as defined in claim 9 wherein said controlling means comprises means for controlling said accessing means and said summing means to determine new pixel values for a subset of the pixels in the source image.

13. Image processing apparatus as defined in claim 9 wherein said means for generating a table comprises means for generating a table section corresponding to each coefficient of the convolution kernel, each table section including products of one of the coefficients multiplied by each possible pixel value.

14. Image processing apparatus as defined in claim 13 wherein said accessing means comprises means for accessing a product in each table section that corresponds to the pixel value of the convolution window pixel.

15. Image processing apparatus as defined in claim 9 wherein said table generating means comprises means for multiplying each of the coefficients by each possible pixel value to provide said products and means for storing said products in said table.

16. Image processing apparatus as defined in claim 15 wherein said means for multiplying comprises means for performing a floating point multiplication operation.

17. A computer-readable medium encoded with a computer program for processing a source image of an object, by convolution of the source image with coefficients of a convolution of a kernel, to provide an output image of the object, said source image and said output image each comprising a two-dimensional array of pixels, each of said pixels in said source image having a value representative of the object, said computer program comprising computer instructions for:

a) prior to processing of said pixels in said source image, generating a table which includes products of each of the coefficients and each of the possible pixel values;

b) processing said pixels in said source image by accessing in said table the product, for each of said coefficients, that corresponds to a pixel value in a convolution window associated with a source pixel;

c) further processing said pixels in said source image by summing the accessed products to provide a new pixel value in the output image; and d) repeating steps b) and c) for each of the source pixels being convolved, wherein the products are accessed and the accessed products are summed without multiplication operations, thereby reducing the time required for processing said source image.

* * * * *